United States Patent
Gryaznevich et al.

(10) Patent No.: US 10,580,535 B2
(45) Date of Patent: Mar. 3, 2020

(54) TOKAMAK WITH POLOIDAL FIELD COIL ARRANGEMENT FOR DOUBLE NULL MERGING IGNITION, METHOD THEREFOR AND NUCLEAR FUSION REACTOR WITH THE SAME

(71) Applicant: Tokamak Energy Ltd., Abingdon, Oxfordshire (GB)

(72) Inventors: Mikhail Gryaznevich, Abingdon (GB); Steven Anthony Milton McNamara, London (GB)

(73) Assignee: Tokamak Energy Ltd., Oxfordshire (GB)

( * ) Notice: Subject to any disclaimer, the term of this patent is extended or adjusted under 35 U.S.C. 154(b) by 0 days.

(21) Appl. No.: 16/481,903

(22) PCT Filed: Jan. 29, 2018

(86) PCT No.: PCT/GB2018/050247
§ 371 (c)(1),
(2) Date: Jul. 30, 2019

(87) PCT Pub. No.: WO2018/138526
PCT Pub. Date: Aug. 2, 2018

(65) Prior Publication Data
US 2019/0392956 A1    Dec. 26, 2019

(30) Foreign Application Priority Data
Jan. 30, 2017 (GB) .................... 1701440.8

(51) Int. Cl.
*H05H 1/12* (2006.01)
*G21B 1/05* (2006.01)
*G21B 1/11* (2006.01)

(52) U.S. Cl.
CPC ............... *G21B 1/057* (2013.01); *G21B 1/11* (2013.01)

(58) Field of Classification Search
CPC ... G21B 1/05; G21B 1/15; G21B 1/00; G21B 1/052; G21B 1/057; Y02E 30/126;
(Continued)

(56) References Cited

U.S. PATENT DOCUMENTS

| 4,343,760 A * | 8/1982 | Luzzi, Jr. ............ G21B 1/13 376/134 |
| 4,774,048 A | 9/1988 | Yang |
| 2013/0221845 A1* | 8/2013 | Edwards .............. G21B 1/05 315/39.55 |

FOREIGN PATENT DOCUMENTS

| JP | S59231469 A | 12/1984 |
| WO | 2013/030554 A1 | 3/2013 |

OTHER PUBLICATIONS

Search Report issued from the United Kingdom Patent Office for related Application No. GB1701440.8 dated Apr. 28, 2017 (3 Pages).
(Continued)

*Primary Examiner* — Minh D A
(74) *Attorney, Agent, or Firm* — Michael Best & Friedrich LLP

(57) ABSTRACT

A tokamak comprising a toroidal containment vessel and a plasma initiation system. The toroidal containment vessel is configured to contain a plasma. The plasma initiation system comprises upper and lower poloidal field, PF, coil sets. Each PF coil set comprises at least one inner PF coil located outside of the containment vessel, an outer PF coil located inside the containment vessel, and shielding located between the outer PF coil and a location of the plasma during operation of the tokamak and configured to protect the outer PF coil from heat emitted by the plasma. The inner and outer
(Continued)

PF coils are configured so as to form a PF null within the containment vessel between the inner and outer PF coils, such that the upper and lower PF coil pairs are operable to initiate a plasma in the containment vessel via double null merging.

12 Claims, 3 Drawing Sheets

(58) Field of Classification Search
CPC ..... Y02E 30/16; Y02E 30/122; Y02E 30/128; H05H 1/22; H05H 1/10; H05H 1/12
See application file for complete search history.

(56) References Cited

OTHER PUBLICATIONS

M. Inomoto et al.,"Centre-solenoid-free merging start-up of spherical tokamak plasmas in UTST", Nuclear Fusion vol. 55, No. 3, Feb. 20, 2015, p. 33013.
J. Kim et al., "Time-dependent optimization of initiation phase of the outer PF coil-only inductive start-up of NSTX plasmas", Plasma Physics and Controlled Fusion, vol. 46, No. 10, Sep. 3, 2004, pp. 1647-1657.
International Search Report with Written Opinion for related Application No. PCT/GB2018/050247 dated Mar. 26, 2018 (18 Pages).
Takuma Yamada et al, "Merging Startup Experiments on the UTST Spherical Tokamak", Plasma and Fusion Research, vol. 5, Jan. 1, 2010, pp. S2100-S2100.
Ryota Imazawa et al, "Spherical tokamak generation and merging on UTST using ex-vessel poloidal field coils only", Electrical Engineering in Japan, John Wiley & Sons, Inc, US, vol. 179, No. 4, Jun. 1, 2012, pp. 18-24.
Hirotomo Itagaki et al, "Development of a Quasi-Steady Equilibrium Field System for Plasma Merging ST Startup Experiments on the UTST Device", Plasma Ano Fusion Research, vol. 8, No. 0, Jan. 1, 2013, pp. 1402139-1402139.
Chung K. J. et al, "Design Features and Commissioning of the Versatile Experiment Spherical Torus (VEST) at Seoul National University", Plasma Science and Technology, Institute of Physics Publishing, Bristol, GB, vol. 15, No. 3, Mar. 19, 2013, pp. 244-251.
F. Hofmann et al, "Feedback stabilization of axisymmetric modes in the TCV tokamak using active coils inside and outside the vacuum vessel", Nuclear Fusion, Mar. 1, 1998, pp. 399-408.
S. S. Abdullaov, "Mapping of magnetic field lines in poloidal divertor tokamaks" In Construction of mappings for hamiltonian systems and their application", Lect. notes. phys. 691", Jan. 1, 2006, Springer-Verlag Berlin Heidelberg, XP055460819.
International Preliminary Report on Patentability for related Application No. PCT/GB2018/050247, dated Dec. 21, 2018 (14 Pages).
Yong Guo et al, "A divertor plasma configuration design method for tokamaks", Chinese Physics B, vol. 25, No. 11, Nov. 1, 2016 (Nov. 1, 2016), p. 115201.
Baonian Wan, "Recent experiments in the EAST and HT-7 superconducting tokamaks", Nuclear Fusion., vol. 49, No. 10, Sep. 9, 2009, p. 104011.

\* cited by examiner

TOKAMAK WITH POLOIDAL FIELD COIL ARRANGEMENT FOR DOUBLE NULL MERGING IGNITION, METHOD THEREFOR AND NUCLEAR FUSION REACTOR WITH THE SAME

FIELD OF THE INVENTION

The present invention relates to a tokamak, for example for use as a fusion reactor. In particular, the invention relates to the arrangement of poloidal field coils used for double null merging in such a tokamak.

BACKGROUND

A tokamak features a combination of strong toroidal magnetic field, high plasma current and, usually, a large plasma volume and significant auxiliary heating, to provide hot, stable plasma. This allows tokamaks to generate conditions so that fusion can occur. The auxiliary heating (for example via tens of megawatts of neutral beam injection of high energy H, D or T) is necessary to increase the temperature to the sufficiently high values required for nuclear fusion to occur, and/or to maintain the plasma current.

The problem is that, because of the large size, large magnetic fields, and high plasma currents generally required, build costs and running costs are high and the engineering has to be robust to cope with the large stored energies present, both in the magnet systems and in the plasma, which has a risk of 'disrupting'—mega-ampere currents reducing to zero in a few thousandths of a second in a violent instability.

The situation can be improved by contracting the donut-shaped torus of a conventional tokamak to its limit, having the appearance of a cored apple—the 'spherical' tokamak (ST). The first realisation of this concept in the START tokamak at Culham demonstrated a huge increase in efficiency—the magnetic field required to contain a hot plasma can be reduced by a factor of 10. In addition, plasma stability is improved, and building costs reduced.

To obtain the fusion reactions required for economic power generation (i.e. much more power out than power in), a conventional tokamak would have to be huge so that the energy confinement time (which is roughly proportional to plasma volume) can be large enough so that the plasma can be hot enough for thermal fusion to occur.

WO 2013/030554 describes an alternative approach, involving the use of a compact spherical tokamak for use as a neutron source or energy source. The low aspect ratio plasma shape in a spherical tokamak improves the particle confinement time and allows net power generation in a much smaller machine. However, a small diameter central column is a necessity, which presents challenges for design of the plasma confinement vessel and associated magnets.

During the initial phase of starting up a tokamak, the neutral gas which fills the confinement vessel must be ionised to produce a plasma. The process, known as "breakdown", "formation" or "initiation", is achieved by passing a time varying current through toroidally wound poloidal field (PF) coils of the tokamak. This time varying current generates a "loop voltage" inside the vessel that, when sufficiently large, causes the gas to break down and form a plasma. The loop voltage produced is a function of the position of the toroidal field coils and the time variation of the current. As well as generating a loop voltage inside the vessel, a current will also be induced in any other toroidally wound conducting loops (e.g. the plasma or the confinement vessel wall).

The most common plasma formation technique uses a solenoid wound in the central column of the tokamak to carry the time varying current and generate the loop voltage. This method is well known, reliable, and used in the majority of tokamaks. However, the compact geometry of spherical tokamaks means that the method is difficult to implement for them—there is limited space in the centre of the torus, and the space is needed for the toroidal field coils, cooling, and neutron shielding. As the size and efficiency of a spherical tokamak is related to the size of the central region, it would be beneficial to operate without a solenoid. Current spherical tokamaks such as MAST and NSTX use a solenoid—but the increased neutron load expected in next generation fusion reactors would make the designs used for those tokamaks impractical due to the extra shielding required.

If a solenoid is not used, then other means must be used to initiate the plasma. Two techniques of interest are "merging compression" (MC) and "double null merging compression" (DNM/double null merging). Plasma formation via merging (either MC or DNM) has further advantages over formation via solenoid. It is theoretically possible (though not yet experimentally confirmed) to achieve high plasma temperature and high plasma currents directly from the merging plasma formation, e.g. plasma temperature greater than 10 keV, which would bring the plasma into the burning regime where self-heating of the plasma is significant. Operating in the burning regime is essential for a practical fusion reactor.

A schematic of the phases of merging compression startup is shown in FIGS. 1A to 1D. Merging compression uses two PF coils 101, one in each of the upper and lower halves of the vacuum vessel 100 to generate the required loop voltage. The current in the PF coils begins at some initial positive value. As this is reduced to zero, two plasma rings 102 are formed around the coils (FIG. 1A). Because each plasma ring carries a current in the same direction, they are attracted towards each other (FIG. 1B) and merge to form a single plasma 103 (FIG. 10). During this merging phase, magnetic energy is converted to kinetic energy in the plasma, accelerating the plasma particles and raising their temperature ("magnetic reconnection"). The speed at which the plasma rings merge can be increased by continuing to reduce the PF coil current below zero, such that it repels the plasma rings and forces them towards each other. The merged plasma is compressed radially inwards, providing additional heating and further increases in the plasma current (FIG. 1D).

Merging compression has been successfully demonstrated on a number of devices, including MAST and START. However, it is impractical for a commercial fusion reactor. The PF coils must be inside the plasma vessel and located close to the final plasma, which means that they would be exposed to intense neutron irradiation and heat flux. The lifetime of such coils would be very limited, and maintaining or replacing components inside the plasma vessel is difficult and expensive.

Double null merging circumvents the problems associated with merging compression by using two pairs of coils, with each pair creating a "null point" in the upper or lower half of the plasma vessel. A "null point" (or X-point") is a location where the net poloidal magnetic field is zero. The present discussion is concerned only with a null point in the poloidal magnetic field, and there will still be some toroidal magnetic field present at the (PF) null points. As shown in FIG. 2, a PF null point 200 can be formed by passing a current in the same direction through two PF coils 201—the PF null will form at a location between them determined by the relative currents in each coil. As there is no PF in this location, the plasma lifetime is relatively large, so plasma will tend to form around the null points. Once a plasma is generated at the PF null points, it can be merged in a similar manner to MC.

The use of PF coils in pairs to create null points enables these PF coils to be placed outside the plasma vessel. A schematic of DNM is shown in FIGS. 3A to D. In the first phase (FIG. 3A), a PF null 301 is created between each pair of PF coils 302. The nulls are created in the upper and lower halves of the plasma vessel. In the second phase (FIG. 3B), the current in the PF coils is reduced. This generates a loop voltage at the null points, causing the neutral gas to breakdown and form a plasma 303. In the third phase (FIG. 3C) the current continues reducing and becomes negative, repelling the plasma rings from the null points and causing them to merge (undergoing magnetic reconnection 304 as with MC). In the fourth phase (FIG. 3D), the plasma is compressed towards the central column 305 to further increase the plasma temperature and current.

While DNM solves the problem of having to provide coils close to the plasma, it introduces new issues. The PF coils are placed close to the vessel walls—which causes the vessel walls to shield the effects of the changing current in the PF coils. As the current in the PF coils changes, a current is induced in the vessel wall which counteracts the change in current. These "image" or "skin" currents reduce the loop voltage at the null point, making plasma breakdown harder and reducing the induced plasma current. For these reasons, DNM is generally considered impractical for a fusion reactor, especially for a compact reactor such as a spherical tokamak.

SUMMARY

According to a first aspect of the invention, there is provided a tokamak. The tokamak comprises a toroidal containment vessel and a plasma initiation system. The toroidal containment vessel is configured to contain a plasma. The plasma initiation system comprises upper and lower poloidal field, PF, coil sets. Each PF coil set comprises at least one inner PF coil located outside the containment vessel, an outer PF coil located inside the containment vessel, and shielding located between the outer PF coil and a location of the plasma during operation of the tokamak and configured to protect the outer PF coil from heat emitted by the plasma. The inner and outer PF coils are configured so as to form a PF null within the containment vessel between the inner and outer PF coils, such that the upper and lower PF coil pairs are operable to initiate a plasma in the containment vessel via double null merging.

According to a further aspect of the invention, there is provided a nuclear fusion reactor comprising a tokamak according to the first aspect.

According to a yet further aspect of the invention, there is provided a method of initiating plasma within a tokamak. The tokamak comprises a toroidal containment vessel configured to contain a plasma, and a plasma initiation system comprising upper and lower poloidal field, PF, coil sets. Each PF coil set comprises at least one inner PF coil located outside of the containment vessel and an outer PF coil located inside the containment vessel. Upper and lower PF nulls are created using the respective upper and lower PF coil sets by passing respective constant currents through each coil of each set. The current in each PF coil is reduced in order to generate a loop voltage at the PF nulls and create a plasma ring at each null. The polarity of the current in each PF coil is reversed in order to aid the merging of the plasma rings.

DETAILED DESCRIPTION

"Inner" and "outer" are used herein with reference to the radial direction of the toroidal plasma chamber, i.e. "inner", "inward" etc. means towards the central column in a radial direction, and "outer", "outward" etc. means away from the central column in a radial direction. These definitions are used independently of any axial separation of the components referred to. In practice, "inner" and "outer" regions can be considered as regions of high and low toroidal magnetic field, respectively, since $B_T \sim 1/R$.

The shielding effect from the vessel wall can be reduced by placing the PF coils inside the vessel—however, the PF coils must then be shielded from direct contact with the plasma and from the heat of the plasma, as well as from the neutrons emitted by the plasma. In a small reactor such as a spherical tokamak, the inner coil of each pair would also be located close to the plasma, resulting in similar high levels of wear to those experienced by MC coils. In order to provide a PF coil arrangement with reduced shielding from the vessel and a satisfactory level of wear, the outer coil of each pair may be placed inside the vessel, with the inner coil placed outside the vessel.

Figure 1:
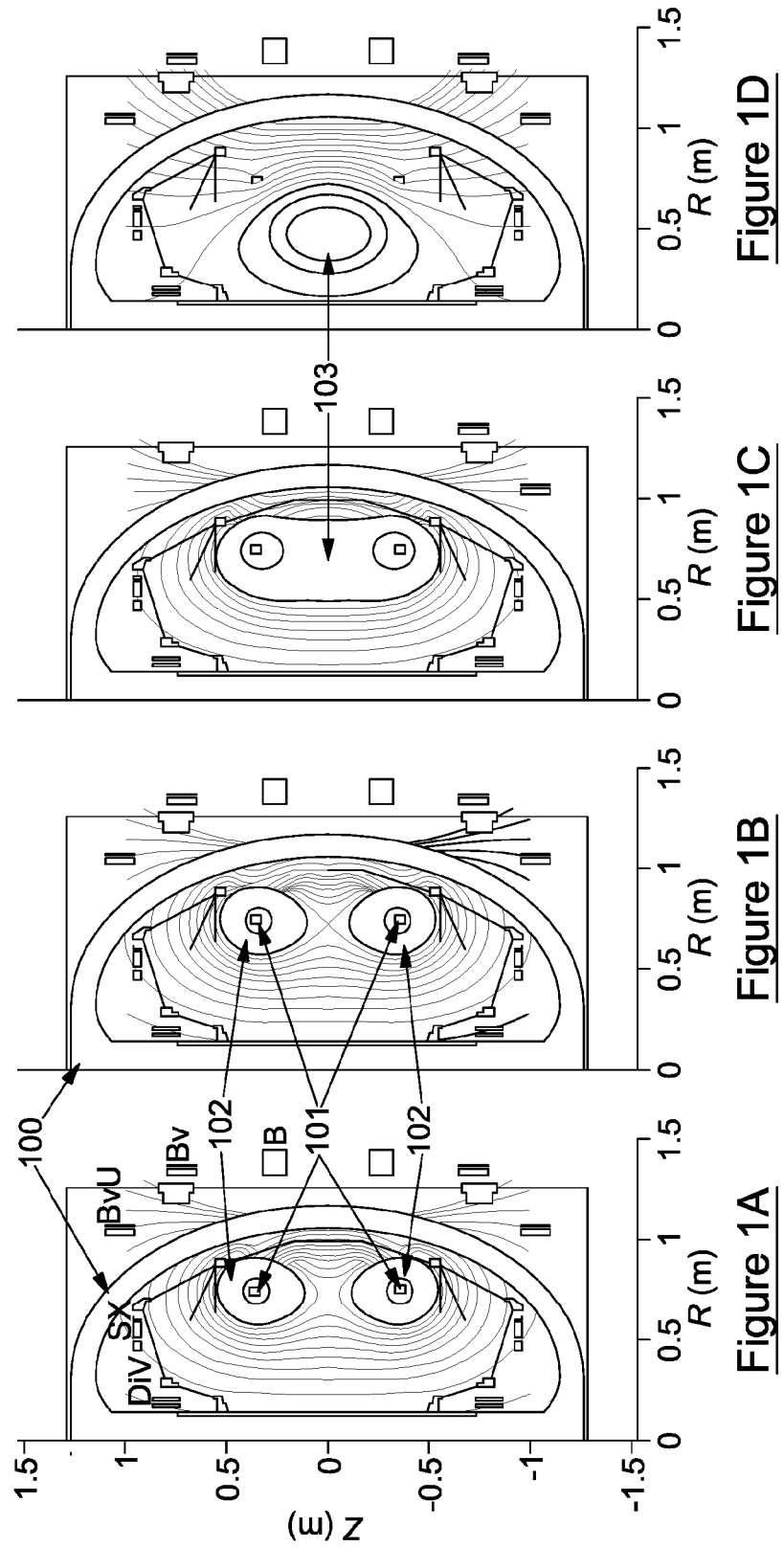
FIGS. 1A to 1D are schematic illustrations of the stages of merging compression.
Figure 2:
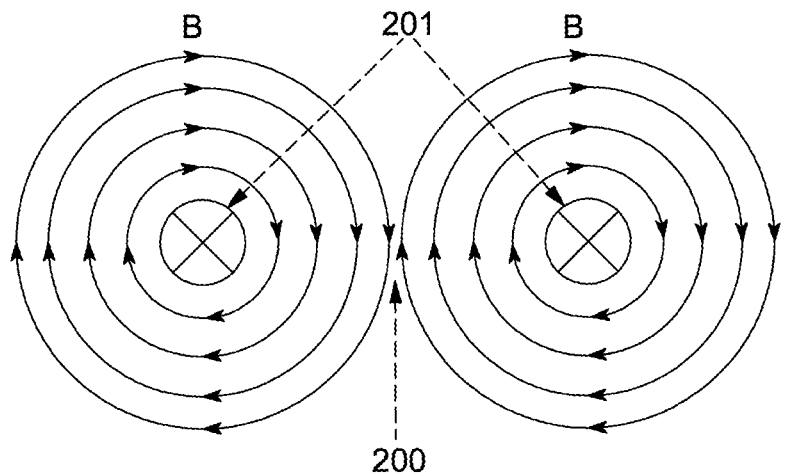
FIG. 2 illustrates the principle of a "null point"
Figures 3A, 3B, 3C, 3D:
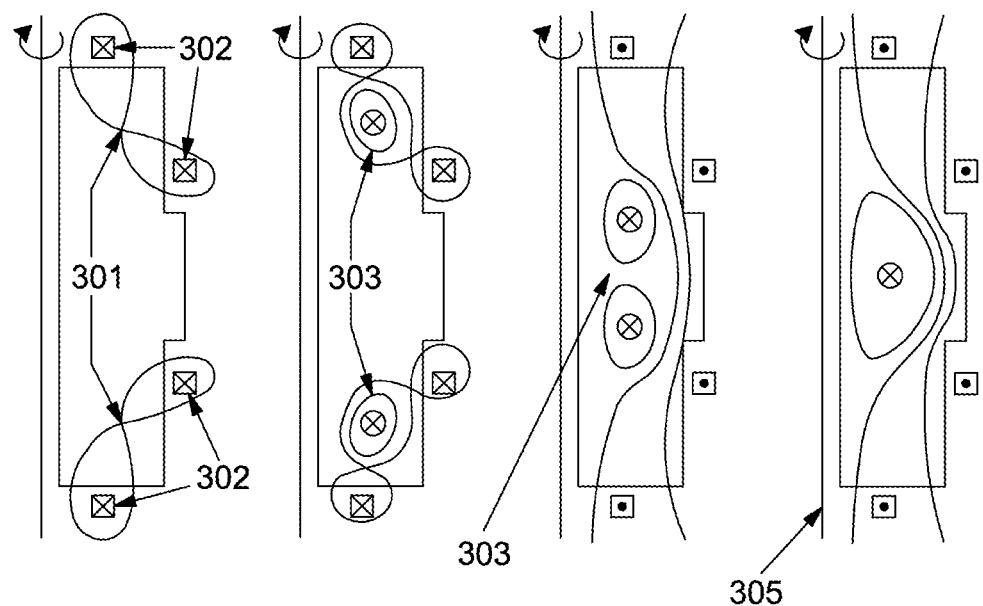
FIGS. 3A to 3D are schematic illustrations of the stages of double null merging.
Figure 4:
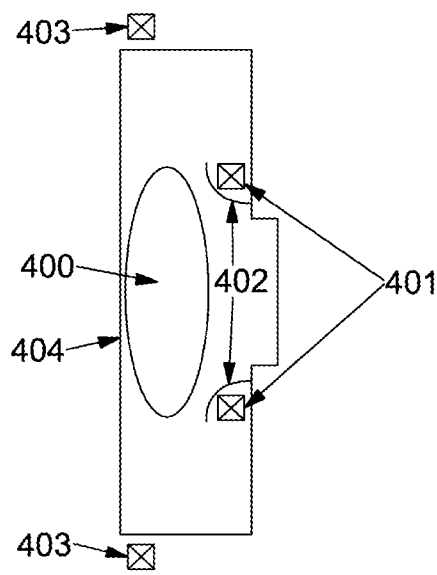
FIG. 4 is a schematic illustration of a cross section of a tokamak according to an embodiment.

FIG. 4 shows a schematic of this arrangement. The outer coils 401 are protected from the heat and neutron emissions of the plasma 400 by a layer of shielding 402. The inner coils 403 are on the outside of the vacuum vessel 404, so do not need any additional shielding. While the shielding extends around the whole torus, the shielding blanket is typically formed of several separate modules, and therefore the image currents generated are minimal. The outer PF coils may be placed behind a layer of shielding which extends out from the vacuum vessel wall, as shown in FIG. 4, or they may be placed directly within a shielding blanket of the vacuum vessel—the latter removes the need for additional shielding, but places the outer PF coils closer to the vacuum vessel wall, which may increase the induced image currents (though less than would be present with the outer PF coil outside the vessel).

The outer coil need not be superconducting—since the current used for DNM is short lived and quickly varying, the losses incurred by using a resistive coil are minimal. Where a non-superconducting coil (e.g. copper, aluminium, beryllium, or other metal or metal alloy) is used, only limited thermal shielding is required for the outer coil—sufficient to prevent structural damage to the coil (e.g. by melting). No neutron shielding is required in that case, since non-superconducting materials are likely to have sufficient lifetime even without neutron shielding. Small amounts of neutron shielding may be provided to extend the lifetime of the coil (and reduce the maintenance required), but the lifetime of the outer coil is likely to be sufficiently long that it would only need to be replaced during routine maintenance of the reactor, even if unshielded. This reduction in the shielding required allows the non-superconducting coil to be located further from the vessel wall—which further reduces the induced image currents. Alternatively, a high temperature superconductor, HTS, outer coil may be used, though this will require neutron shielding.

The inner coils also need not be superconducting, i.e. they may be a metal or metal alloy, unless they are used for purposes other than DMN which would require a superconducting coil.

In general, the aim is for the outer coil to couple better to the plasma formed at the null points than to the vessel—so that most of the power going into the coil is used to create and induce currents in the plasma, rather than to create image currents in the vessel wall. This will generally be the case when the coil is inside the vessel.

The inner PF coil may be multi-purpose—i.e. acting both during DNM, and during other phases of reactor operation, e.g. as a diverter coil. If so, then the location of the inner PF coil is likely to be constrained by those other purposes. The positioning of the outer PF coil (or any inner coil which is only used for DNM) is determined by the desired location and properties of the initial plasma, the loop voltage required at the null point, and any structural constraints, though by adjusting the relative "current turns" (coil current×number of turns) in each coil during DNM, the position of the outer PF coil can be varied somewhat.

Multiple inner coils may be used and their fields configured to position the nulls as required, in which case there is a relatively large amount of freedom in the positioning of the outer PF coils, i.e. anywhere on the low field side of the plasma vessel, in the upper or lower half (depending on which null the outer PF coil is associated with).

During the final stage of double null merging, when the plasmas actually merge, further additional inner coils may be used to push the plasmas together—either in combination with or instead of reversing the current in the coils used to create the nulls.

Figures 5A, 5B, 5C:
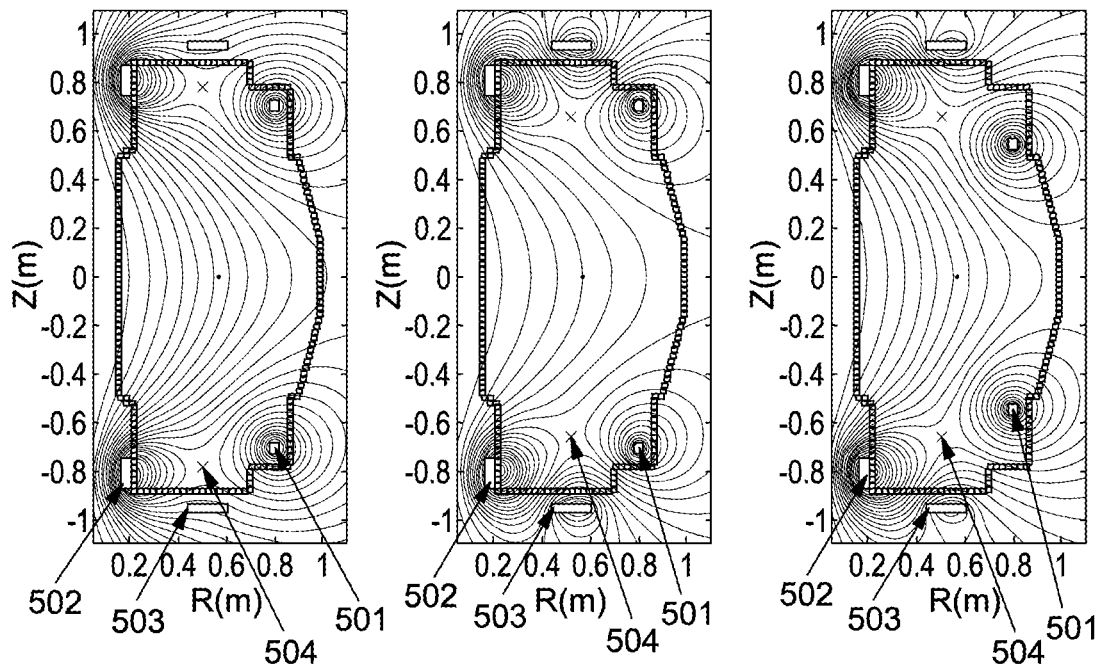
FIGS. 5A to 5C are schematic illustrations of arrangements of poloidal field coils according to respective embodiments.

FIGS. 5A to 5C show three exemplary arrangements of the PF coils. In each figure, the upper and lower half of the plasma vessel each have an outer PF coil 501 and first and second inner PF coils 502, 503. In FIG. 5A, only the first inner PF coil is used for DNM, and so the null 504 is positioned between the first inner PF coil and the outer PF coil (in practice, there will be some variation due to other magnetic fields). In FIG. 5B, the second inner PF coil is also used for DNM. By varying the relative field strengths of the first and second inner PF coil and the outer PF coil, the position of the null 504 can be controlled over a wider range than with just two coils. In this case, the second PF coil is used to push the null away from the wall of the vacuum vessel (allowing for larger, more stable initial plasmas). FIG. 5C shows an arrangement where the null 504 is located in the same place as FIG. 5B, but the outer PF coil is in a different location, with the field strengths of each coil adjusted to compensate for this.

It will be appreciated by the person of skill in the art that various modifications may be made to the above described embodiments without departing from the scope of the invention.

The invention claimed is:

1. A tokamak comprising:
 a toroidal containment vessel configured to contain a plasma;
 a plasma initiation system comprising upper and lower poloidal field, PF, coil sets, each PF coil set comprising:
   at least one inner PF coil located outside the containment vessel;
   an outer PF coil located inside the containment vessel;
   wherein the inner PF coil is located radially inward of the outer PF coil;
   shielding located between the outer PF coil and a location of the plasma during operation of the tokamak and configured to protect the outer PF coil from heat emitted by the plasma;
   the inner and outer PF coils being configured so as to form a PF null within the containment vessel between the inner and outer PF coils, such that the upper and lower PF coil pairs are operable to initiate a plasma in the containment vessel via double null merging.

2. A tokamak according to claim 1, wherein the shielding is further configured to shield the outer PF coil from neutrons emitted by the plasma tokamak.

3. A tokamak according to claim 2, wherein the outer PF coil is formed from high temperature superconductor, HTS.

4. A tokamak according to claim 1, wherein the outer PF coil is formed from a material which is not superconducting during operation of the outer PF coil.

5. A tokamak according to claim 4, wherein the material comprises any of:
 copper;
 aluminium;
 beryllium;
 a metal;
 a metal alloy.

6. A tokamak according to claim 1, wherein the outer PF coil is located within a shielding blanket of the containment vessel, and wherein said shielding located between the outer PF coil and the location of the plasma is a part of said shielding blanket.

7. A tokamak according to claim 1, wherein the shielding is composed of several modules such that each module extends around only a portion of the toroidal containment vessel.

8. A tokamak according to claim 1, wherein the tokamak is a spherical tokamak.

9. A tokamak according to claim 1, wherein the outer PF coil is configured to magnetically couple better to a plasma located at the PF null than to the containment vessel, such that when power is applied to the PF coil, a proportion of the power which results in creation and induction of currents in the plasma, is greater than a proportion of the power which results in creation and induction of currents in the containment vessel.

10. A nuclear fusion reactor comprising a tokamak according to claim 1.

11. A method of initiating plasma within a tokamak, wherein the tokamak comprises a toroidal containment vessel configured to contain a plasma, a plasma initiation system comprising upper and lower poloidal field, PF, coil sets, each PF coil set comprising at least one inner PF coil located outside of the containment vessel and an outer PF coil located inside the containment vessel, the method comprising:

creating upper and lower PF nulls using the respective upper and lower PF coil sets by passing respective constant currents through each coil of each set;
reducing the current in each PF coil in order to generate a loop voltage at the PF nulls and create a plasma ring at each null;
the plasma rings merging to form a single plasma.

12. A method according to claim 11, and comprising reversing a polarity of the current in each PF coil in order to aid the merging of the plasma rings.

* * * * *